United States Patent
Fecteau et al.

[11] Patent Number: 5,610,959
[45] Date of Patent: Mar. 11, 1997

[54] HAFNIUM DOPED REPLACEMENT ROD FOR NUCLEAR FUEL RECONSTITUTION

[75] Inventors: Mark W. Fecteau, Export; James W. Miller, Murrysville, both of Pa.

[73] Assignee: Westinghouse Electric Corporation, Pittsburgh, Pa.

[21] Appl. No.: 364,170

[22] Filed: Dec. 27, 1994

[51] Int. Cl.⁶ .................................................. G21C 3/00
[52] U.S. Cl. .......................... 376/419; 376/333; 376/327; 376/434; 376/339
[58] Field of Search .................. 376/333, 327, 376/419, 434, 339; 252/636, 637, 638, 639, 640

[56] References Cited

U.S. PATENT DOCUMENTS

| | | | |
|---|---|---|---|
| 4,061,536 | 12/1977 | Creagan et al. | 376/439 |
| 4,432,934 | 2/1984 | Gjertsen et al. | 376/333 |
| 4,526,741 | 7/1985 | Cawley et al. | 376/185 |
| 4,655,999 | 4/1987 | Maruyama et al. | 376/333 |
| 4,664,878 | 5/1987 | Wilson et al. | 376/328 |
| 4,687,621 | 8/1987 | Ferrari | 376/209 |
| 4,851,181 | 7/1989 | Takeda et al. | 376/267 |
| 4,863,681 | 9/1989 | Hatfield | 376/451 |
| 5,034,185 | 7/1991 | Ueda et al. | 376/333 |
| 5,064,607 | 11/1991 | Miller et al. | 376/333 |
| 5,276,718 | 1/1994 | Ueda | 376/220 |

*Primary Examiner*—Charles T. Jordan
*Assistant Examiner*—Meena Chelliah
*Attorney, Agent, or Firm*—D. G. Maire

[57] ABSTRACT

A replacement rod for insertion into a nuclear fuel assembly to replace a fuel rod containing a neutron absorbing, fissile fuel, includes Hafnium sufficient to substantially replace the neutron absorption capacity of the fuel rod. The replacement rod also includes a non-fissile second material that is commonly used for structures in nuclear fuel assemblies. The second material is preferably selected from the group consisting of a stainless steel, a zirconium alloy and zirconium. In one embodiment, the Hafnium is fabricated into a cylindrically-shaped rodlet, or core, and the second material is fabricated into an annulus around the core. Alternatively, the Hafnium and the second material are each distributed about uniformly throughout a cylindrical volume of the replacement rod. Refurbishing nuclear fuel assemblies by replacing damaged fuel rods with replacement rods according to the invention obtains an improved peaking factor over prior art methods.

21 Claims, 5 Drawing Sheets

HAFNIUM DOPED REPLACEMENT ROD FOR NUCLEAR FUEL RECONSTITUTION

BACKGROUND OF THE INVENTION

1. Field of the Invention

The invention relates to the field of fuel assemblies for nuclear reactors, and, in particular, concerns a replacement rod for replacing a damaged fuel rod in a fuel assembly, and also concerns a method of reducing the peaking factor in a nuclear reactor fuel assembly in which one or more fuel rods are removed.

2. Description of the Prior Art

The core of a pressurized water nuclear reactor used for power generation typically includes a plurality of fuel assemblies, each fuel assembly typically comprising a parallel array of elongated, cylindrically-shaped fuel rods, a central instrument thimble, and several guide tubes dispersed among the fuel rods for insertion of control rods. Circulating water in a primary cooling system passes through the core between the rods and the guide tubes to cool the core and to transport heat to steam generators. Each fuel rod typically includes a stack of fissile fuel pellets, such as, for example, $UO_2$ pellets isotopically enriched with U235 to about 5% by weight, contained within a thin cladding of a zirconium alloy, such as Zircalloy-4.

The cladding is highly resistive to damage from radiation, heat, and chemicals in the cooling water, however, pinholes and cracks develop in some fuel rods after months or years in service. The damaged fuel rods must be removed from the core to prevent leakage of radioactive fuel and fission by-products from the fuel rod into the primary cooling system. Typically, the damaged fuel rods are replaced with a non-fissile rod of the same dimensions as the removed fuel rod, fabricated of a material commonly used in nuclear reactor structures, such as stainless steel or a Zirconium alloy, like Zircalloy, or alternatively the damaged fuel rods are replaced with a fuel rod containing $UO_2$ pellets having a low U235 isotopic enrichment, such as a natural enrichment or depleted uranium.

The power output of fuel rods located nearby a prior art replacement rod typically rises because the replacement rod does not absorb neutrons to the same extent as the damaged fuel rod that it replaced. This is true for nonfissile stainless steel or Zircalloy replacement rods and for low-enrichment uranium rods. The neutrons not absorbed by the replacement rod, which otherwise would have been absorbed by the damaged fuel rod, can be absorbed by the nearby fuel rods, causing a higher fission rate and a faster burn-up of fuel in the nearby fuel rods. The peaking factor, which is defined as the ratio of the power output of the fuel rod with the highest power output to the average power output of all the fuel rods in a fuel assembly, is therefore typically raised by the replacement of a damaged fuel rod with a replacement rod. In some cases this increase of the peaking factor cannot be accomodated by the available margins, and relocation or replacement of the entire assembly may be required. Such action reduces the neutronic and economic efficiency of the reactor. Therefore, it is desirable to provide a replacement rod for damaged fuel rods that does not increase the peaking factor in a fuel assembly to the extent caused by prior art replacement rods.

SUMMARY OF THE INVENTION

It is an object of the invention to provide a replacement rod for a damaged fuel rod in a fuel assembly of a nuclear reactor.

It is another object of the invention to provide a method of reducing the peaking factor in a nuclear reactor fuel assembly in which one or more fuel rods have been removed.

It is another object of the invention to provide a method of refurbishing a nuclear fuel assembly having one or more damaged fuel rods.

These and other objects are obtained by use of a replacement rod for insertion into a nuclear fuel assembly to replace a fuel rod containing a neutron absorbing, fissile fuel, the replacement rod including Hafnium sufficient to substantially replace the neutron absorption capacity of the fuel rod. The replacement rod also includes a non-fissile second material that is commonly used for structures in nuclear fuel assemblies. According to another aspect of the invention, the second material is selected from the group consisting of a stainless steel, a zirconium alloy and zirconium.

According to another aspect of the invention, the Hafnium is fabricated into a cylindrically-shaped rodlet, or core, and the second material is fabricated into an annulus around the core. Alternatively, the Hafnium and the second material are each distributed about uniformly throughout a cylindrical volume of the replacement rod.

According to another aspect of the invention, a fuel assembly for a nuclear reactor includes a plurality of fuel rods each containing a fissile fuel and each having a neutron absorption capacity. The fuel assembly also includes at least one replacement rod, wherein each replacement rod includes Hafnium sufficient to substantially replace the neutron absorption capacity of a fuel rod, and a non-fissile second material that is commonly used for structures in nuclear fuel assemblies. The second material can be selected from the group consisting of a stainless steel, a zirconium alloy and zirconium.

The invention also provides a method for reducing the peaking factor in a nuclear fuel assembly, wherein the fuel assembly includes a plurality of elongated fuel rods arranged in a parallel array, each fuel rod containing a fissile fuel and each fuel rod having a neutron absorption capacity, the method including the steps of: removing a damaged one of the fuel rods from a first position of the fuel assembly; and inserting a replacement rod into the fuel assembly in the first position, wherein the replacement rod includes hafnium sufficient to substantially replace the neutron absorption capacity of the damaged fuel rod, and a non-fissile second material that is commonly used for structures in nuclear fuel assemblies. The second material can be selected from the group consisting of a stainless steel, a zirconium alloy and zirconium.

According to another aspect of the invention, a method for refurbishing a fuel assembly in a nuclear reactor includes the step of replacing a damaged fuel rod from the fuel assembly with a replacement rod that includes Hafnium sufficient to substantially replace the neutron absorbing capacity of the damaged fuel rod.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

Figure 1:
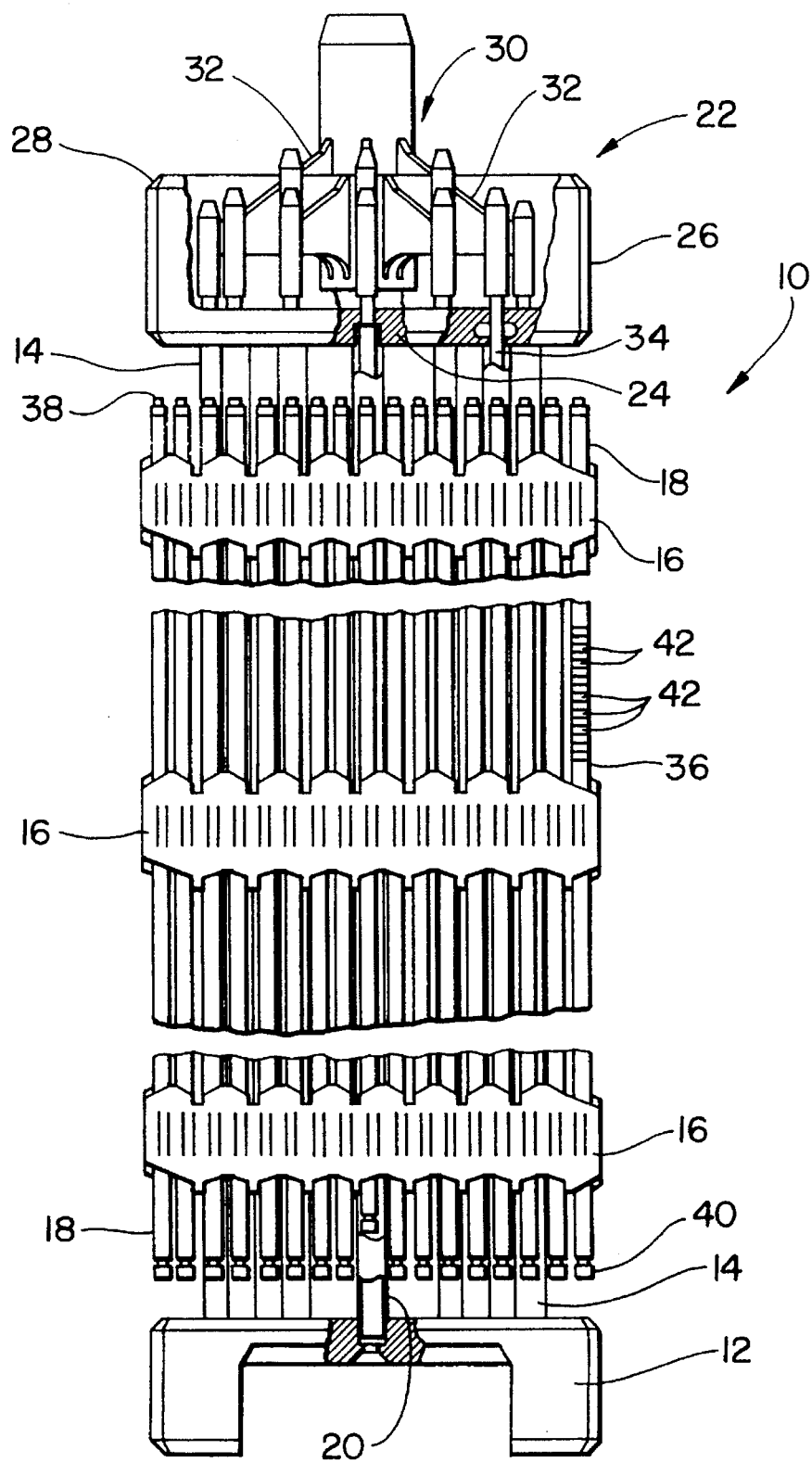
FIG. 1 is a partially sectioned, elevation view of a conventional fuel assembly, being shown in vertically foreshortened form and with parts broken away for clarity, having a damaged fuel rod replaced with a replacement rod in accordance with the present invention.

Referring to FIG. 1, there is shown an elevation view of a conventional "17×17" fuel assembly used in a pressurized water reactor (PWR), represented in vertically foreshortened form and being generally designated by the numeral 10. While the present invention is intended to be used with fuel assemblies such as fuel assembly 10, the invention is equally applicable to other fuel assembly arrangements, such as, for example, "15×15" fuel assemblies and "14×14" fuel assemblies.

Fuel assembly 10 includes a bottom nozzle 12 for supporting the assembly 10 on a lower plate (not shown) in the core region of a nuclear reactor (not shown), a number of longitudinally extending guide thimbles 14 projecting upwardly from the bottom nozzle 12, a plurality of transverse grids 16 axially spaced along the guide thimbles 14, an organized array of parallel, elongated fuel rods 18 transversely spaced and supported by the grids 16, a centrally located instrumentation tube 20, and a top nozzle 22 attached to the upper ends of guide thimbles 14, together forming an integrated assembly. Several score of such assemblies are typically included in a nuclear reactor core.

The top nozzle 22 includes a transversely extending adapter plate 24 having upstanding side walls 26 secured to the peripheral edges of the plate 24 to define an enclosure. An annular flange 28 secured to the top of the sidewalls defines an opening containing a spider assembly 30. The spider assembly 30 has radially extending flukes 32 connecting to the upper ends of control rods 34 which are adapted to be inserted down through the guide tubes 14. The spider assembly 30 is connected to a control/drive mechanism (not shown) which is operable in a well known manner to move the control rods 34 in and out of the guide tubes 14 for controlling the power output of the reactor.

The fuel rods 18 include a cladding tube 36 sealed by plugs 38, 40 at the top and bottom ends, respectively, and a stack of cylindrical fuel pellets 42 contained within the cladding tube 36. The fuel pellets 42 are typically fabricated of sintered $UO_2$ isotopically enriched with U235 to about 5% by weight. Coolant water in the primary cooling system circulates through the core in the spaces between the fuel rods 18 and the guide tubes 14. Over extended periods of use in an operating reactor, the cladding tubes 36, which are generally fabricated of a zirconium alloy, such as Zircalloy-2 or Zircalloy-4, can develop cracks or pinholes due to the harsh conditions within the core. The fuel rods 18 in the fuel assembly 10 can be inspected for such damage, and the fuel assembly 10 refurbished by replacing the damaged rods. Typically, there are only one or two damaged fuel rods that need replacement in an assembly during a scheduled maintenance of the reactor.

If fuel rods 18 are removed from the fuel assembly, as when damaged fuel rods are replaced during refurbishment of the fuel assembly 10, and if no replacement rods are used, the coolant water which fills the volume of the removed rods in the fuel assembly 10 moderates the neutrons and causes the power output of adjacent fuel rods remaining in the fuel assembly 10 to increase to unacceptable levels. Therefore, replacement rods, such as natural Uranium replacement rods, stainless steel replacement rods and Zirconium alloy replacement rods have been used in the past. However, significant increases in peaking factor remains with these prior art replacement rods. Therefore, a replacement rod employing Hafnium to compensate for the neutron absorbing capacity of a removed fuel rod is provided by the invention.

According to the invention, the fuel assembly 10 is refurbished by replacing the damaged fuel rods with replacement rods that include Hafnium substantially sufficient to replace the neutron absorbing capacity of the damaged rod. The replacement rods preferably have the same dimensions as the damaged rods they replace. End caps are generally not necessary, since the replacement rods are preferably solid cylinders.

Figure 2:
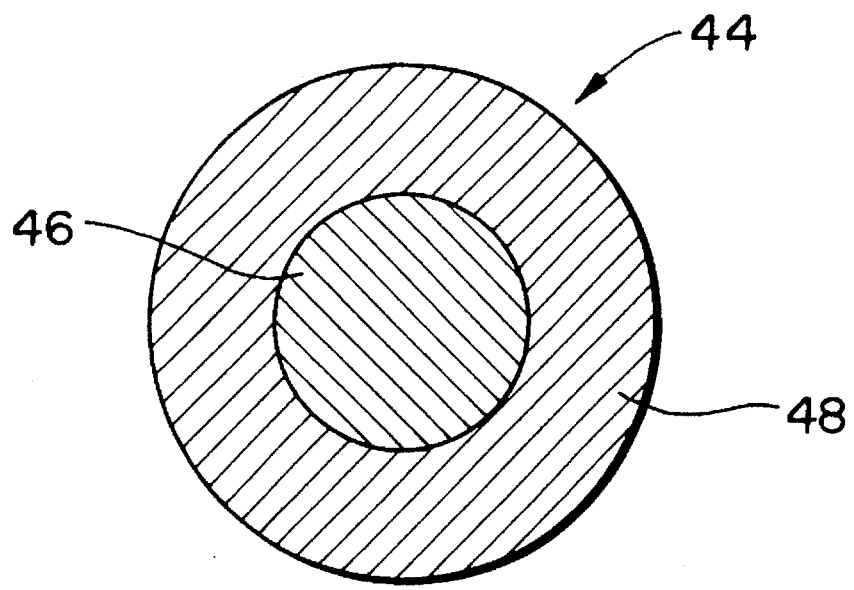
FIG. 2 is a section view of a preferred embodiment of a replacement rod according to the invention.

FIG. 2 is a sectional view of one embodiment of a replacement rod 44 according to the invention. The replacement rod 44 includes a central core 46 of Hafnium and an outer annulus 48 of a second material. The second material is preferably a non-fissile material that is commonly used in structures in the core region of nuclear reactors, such as an alloy of Zirconium, Zirconium, and a stainless steel. A structure as illustrated in FIG. 2 can be formed by a well known method, such as, for example, by co-extruding the Hafnium and the second material.

Figure 3:
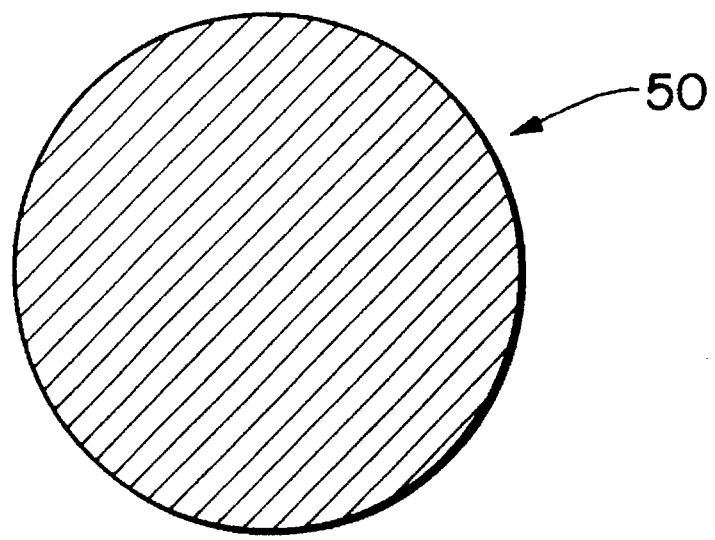
FIG. 3 is a section view of a second preferred embodiment of a replacement rod according to the invention.

FIG. 3 is a sectional view of a second embodiment of a replacement rod 50 according to the invention. The replacement rod 50 includes Hafnium and the second material each about uniformly dispersed through a cylindrically-shaped section of the rod 50. The Hafnium can be alloyed with the second material, combined with the second material in a metal mixture, or otherwise structured such that each of the Hafnium and the second material are about uniformly distributed. As with the replacement rod illustrated in FIG. 2, the second material is preferably a non-fissile material that is commonly used in structures in the core region of nuclear reactors, such as an alloy of Zirconium, Zirconium, or a stainless steel.

Figure 4:
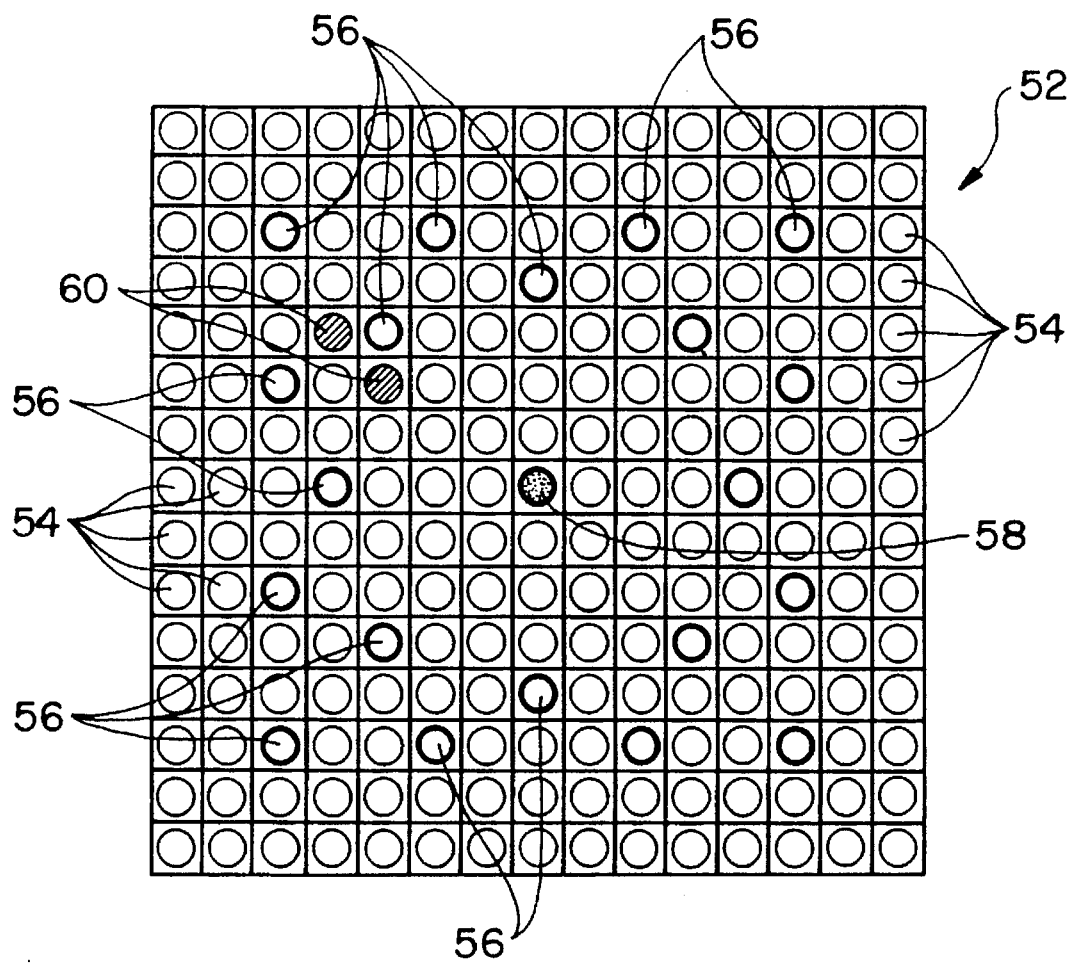
FIG. 4 is a schematic plan view of a 15×15 fuel assembly used for calculating the peaking factor for different embodiments of the replacement rod, showing the location of two replacement rods used to replace two failed $UO_2$ fuel rods.

FIG. 4 schematically illustrates a plan view of a "15 ×15" fuel assembly 52 that normally includes 204 $UO_2$ fuel rods 54, 20 guide tubes 56, and a central instrument thimble 58. The fuel assembly has been refurbished by replacing two failed fuel rods with replacement rods 60 according to the invention. Calculations of the peaking factor for various embodiments of the invention were based upon the fuel assembly arrangement illustrated in FIG. 4.

Computer calculations of peaking factor were completed for a single fuel assembly using a program code based upon a two-dimensional, neutron transport theory, assuming cyclic boundary conditions. Cyclic boundary conditions were employed because the replacement rods are asymmetrically located within the fuel assembly and the intent was to set up the calculation with minimum interaction from replacement rods located in adjacent fuel assemblies.

The output of the computer calculation is the relative power of each fuel rod, normalized to the average power of all the fuel rods in the fuel assembly. Some rods have a relative power less than 1.0, and some have a relative power that is greater than 1.0. The peaking factor is the maximum relative power. A goal of nuclear fuel designs is to maintain the peaking factor as low as feasible.

The model for the calculation assumes each fuel rod includes a Zircalloy-4 cladding tube having an outer diameter of 0.422 inches and contains $UO_2$ fuel pellets enriched with U235 to 5% by weight. The peaking factor for an intact "15×15" fuel assembly, not refurbished by having any fuel rods removed or replaced and still having 204 fuel rods, is 1.074. For the calculations plotted in FIGS. 5 and 6, two fuel rods have been removed from locations shown in FIG. 4 and replaced with replacement rods of various designs. The locations for the replacement rods were chosen such as to make peaking factor as large as possible, i.e. a worst case scenario for replacing two fuel rods.

Figure 5:
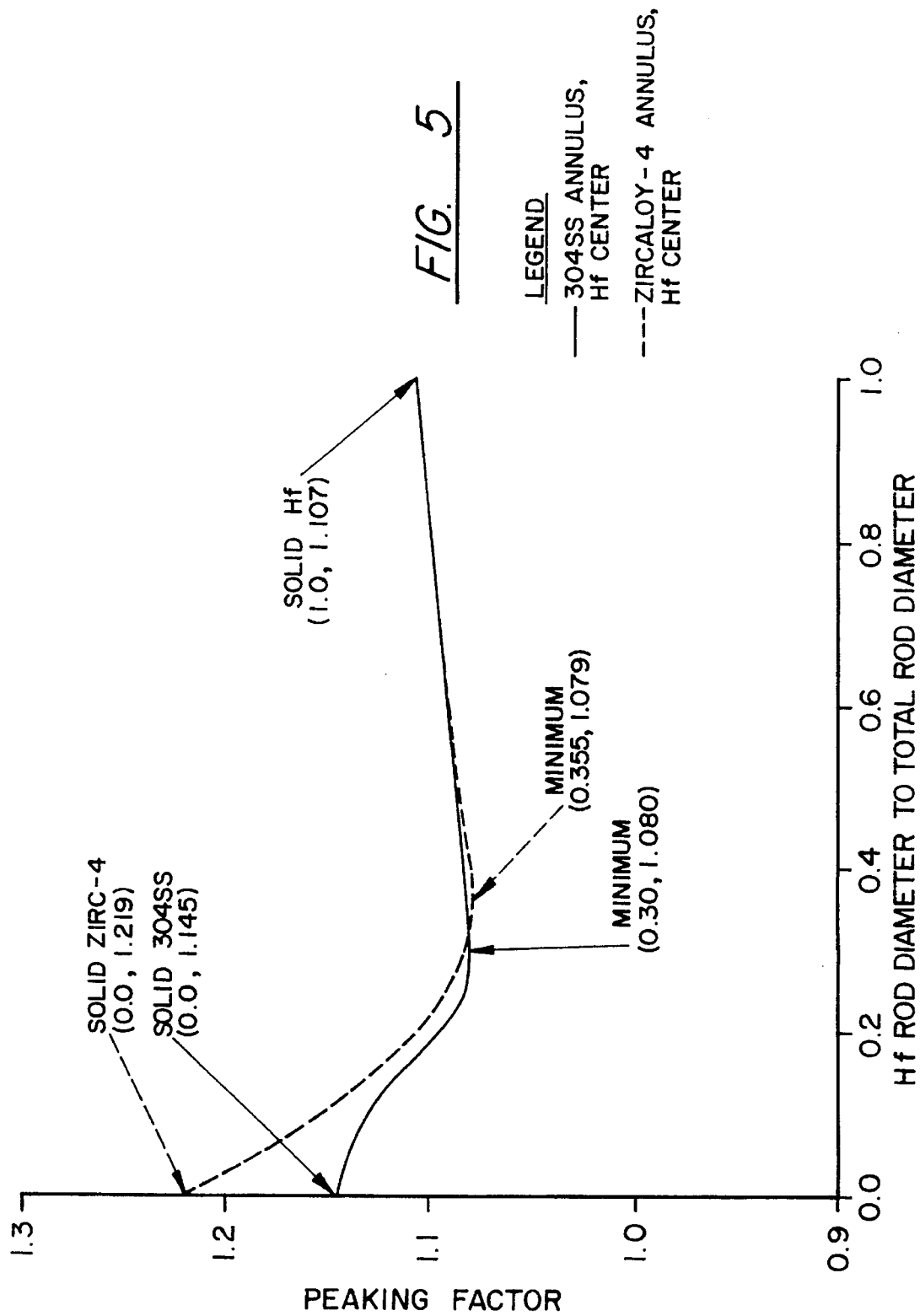
FIG. 5 plots peaking factor as a function of the ratio of Hafnium rod diameter to replacement rod diameter for two embodiments of the invention shown in FIG. 2, wherein zircaloy-4 and 304 stainless steel are the materials used for the annulus. The assembly arrangement of FIG. 4 was used to produce the plots.

FIG. 5 plots peaking factor in the case where two fuel rods have been replaced, in locations as shown in FIG. 4, with replacement rods that are constructed according to the invention with a Hafnium core surrounded by an annulus fabricated of the second material (see FIG. 2). The peaking factor is plotted as a function of the ratio DR of core diameter to annulus diameter. In the case where the second material is Zircalloy-4, plotted as a solid line, the peaking factor is about 1.219 for a pure Zircalloy-4 replacement rod and 1.107 for a pure Hafnium rod. Substantial benefit is obtained for a DR that is greater than about 0.2. A greater benefit is obtained for DR between about 0.22 and about 0.78, and even more benefit is achieved for DR between about 0.30 and about 0.42. The minimum peaking factor, 1.079, is obtained with a DR that is about 0.355.

The second plot shown in FIG. 5 is for the case where the second material is 304 stainless steel, indicated by a dashed line. The peaking factor is about 1.145 for a pure 304 stainless steel replacement rod and 1.107 for a pure Hafnium rod. Substantial benefit is obtained for a DR that is greater than about 0.15. A greater benefit is obtained for DR between about 0.18 and about 0.82, and even more benefit is achieved for DR between about 0.25 and about 0.38. The minimum peaking factor, 1.080, is obtained with a DR that is about 0.30.

Figure 6:
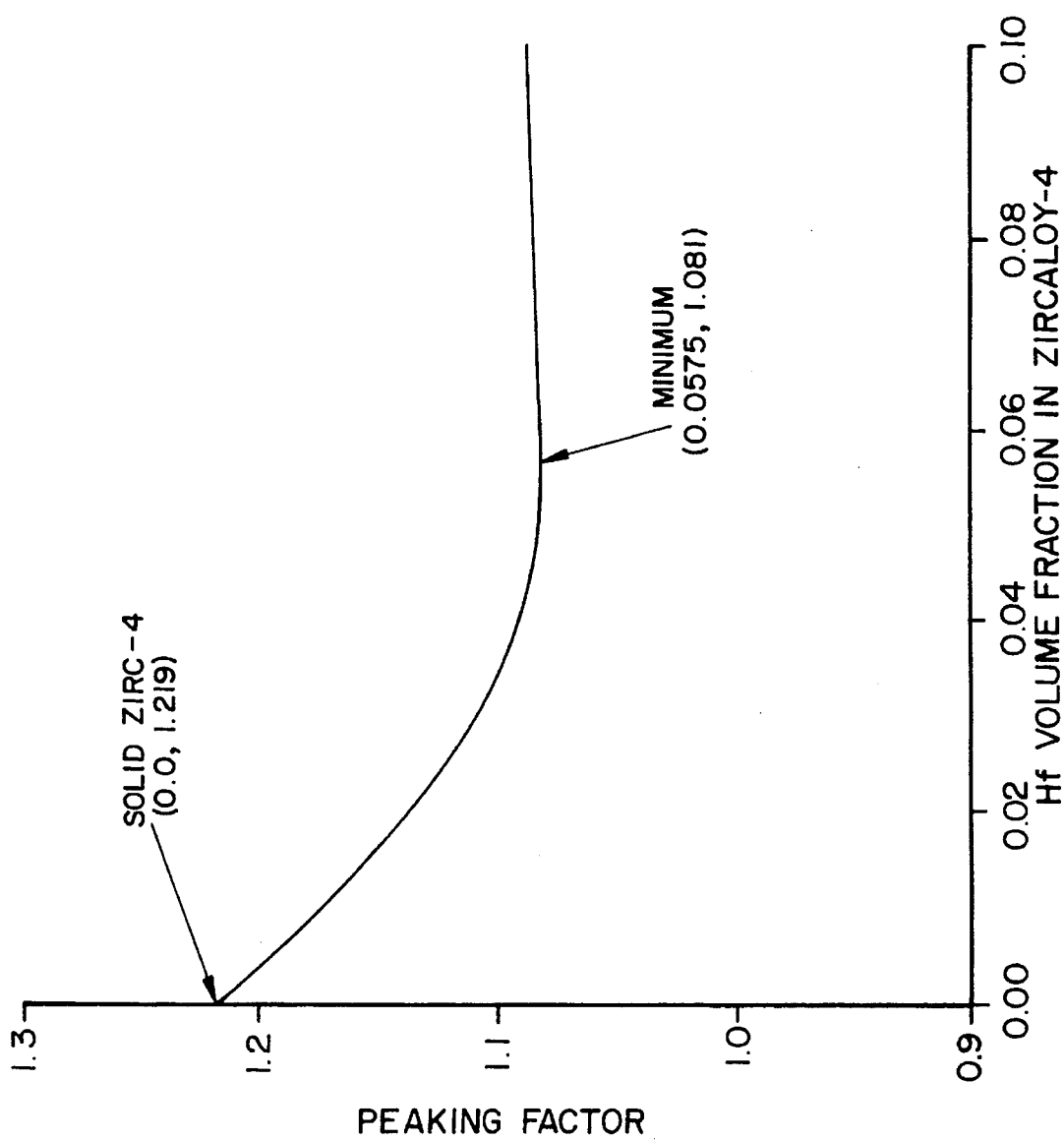
FIG. 6 plots peaking factor as a function of the volume ratio of Hafnium to the second material for the embodiment of the invention shown in FIG. 3, wherein zircaloy-4 is the second material. The assembly arrangement of FIG. 4 was used to produce the plot.

FIG. 6 is a plot of peaking factor versus Hafnium volume fraction VR in the case where two fuel rods have been replaced, in locations as shown in FIG. 4, with replacement rods that are constructed according to the invention with each of the Hafnium and second material about uniformly distributed in the replacement rods (see FIG. 3), wherein the second material is Zircalloy-4. In this case, substantial benefit is obtained for a VR that is greater than about 0.03. A greater benefit is obtained for DR between about 0.034 and about 0.08, and even more benefit is achieved for VR between about 0.048 and about 0.075. The minimum peaking factor 1.081 is obtained with a VR that is about 0.0575.

It should be understood that the specific proportions of hafnium to the second material discussed with reference to the computer simulations are exemplary only. The calculations were performed with a specific arrangement of fuel rods and replacement rods, and the calculations can be further affected by the enrichment of the fuel rods, the diameter of each fuel rods, the age of the fuel rods, the positions of the control rods and other factors. Therefore, it is contemplated that there will be a range of DR or DR that will be usable in a variety of situations that will obtain a benefit in the peaking factor when refurbishing a fuel assembly.

Arrangements of Hafnium with the second material other than those discussed hereinbefore are also encompassed by the invention. For example, the hafnium can be formed into an annulus within a larger annulus fabricated of the second material. The hafnium can also be distributed as a plurality of parallel rodlets contained within a matrix of the second material. A third material may also be used in conjunction with the Hafnium and the second material. For example, a replacement rod can be fabricated with Hafnium, stainless steel and a Zirconium alloy.

While particular choices for the material, such as Zircalloy-4 and 304 stainless steel, have been used in the foregoing discussion as examples of preferred embodiments of the invention, it will be understood by those skilled in the art that the scope of the invention is not limited to those particular materials. Zirconium alloys, and especially nickel-free Zirconium alloys, are especially useful because of their resistance to corrosion and low interaction cross section with thermal neutrons. A variety of stainless steels other than 304 stainless steel may be chosen to suit other design criteria, such as, for example, the ease with which it can be formed into structures like those illustrated in FIGS. 1 and 2, corrosion resistance, or neutron absorption cross section.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

What is claimed:

1. A replacement rod for insertion into a nuclear fuel assembly to replace a fuel rod containing a neutron absorbing, fissile fuel, the replacement rod comprising Hafnium sufficient to substantially replace the neutron absorption capacity of the fuel rod, and a second material, wherein the Hafnium is fabricated into a cylindrically-shaped rodlet and the second material is fabricated into an annulus around the rodlet.

2. The replacement rod of claim 1, wherein the second material is selected from the group consisting of a stainless steel, a zirconium alloy and zirconium. rodlet.

3. The replacement rod of claim 1, wherein the second material is zircaloy-4 alloy, and the ratio DR of the rodlet diameter to the annulus outer diameter is greater than about 0.2.

4. The replacement rod of claim 3, wherein DR is between about 0.22 and about 0.78.

5. The replacement rod of claim 4, wherein DR is between about 0.30 and about 0.42.

6. The replacement rod of claim 1, wherein the second material is 304 stainless steel and the ratio DR of the rodlet diameter to the annulus outer diameter is greater than about 0.15.

7. The replacement rod of claim 6, wherein DR is between about 0.17 and about 0.83.

8. The replacement rod of claim 7, wherein DR is between about 0.25 and about 0.4.

9. The replacement rod of claim 1, wherein the record material is Zircloy-4.

10. A fuel assembly for a nuclear reactor comprising a plurality of fuel rods each containing a fissile fuel each having a neutron absorption capacity, and at least one replacement rod, wherein each replacement rod includes Hafnium sufficient to substantially replace the neutron absorption capacity of a fuel rod, and a second material, wherein the Hafnium is fabricated into a cylindrically-shaped rodlet and the second material is fabricated into an annulus around the rodlet.

11. The fuel assembly of claim 11, wherein the second material is selected from the group consisting of a stainless steel, a zirconium alloy and zirconium.

12. The fuel assembly of claim 10, wherein the second material is zircaloy-4, and the ratio DR of the rodlet diameter to the annulus outer diameter is between about 0.22 and about 0.78.

13. The fuel assembly of claim 12, wherein DR is between about 0.32 and about 0.4

14. The fuel assembly of claim 10, wherein the second material is 304 stainless steel and the ratio DR of the rodlet diameter to the annulus outer diameter is between about 0.17 and about 0.83.

15. The fuel assembly of claim 14, wherein DR is between about 0.27 and about 0.35.

16. The fuel assembly of claim 11, wherein the Hafnium and the second material are each distributed about uniformly throughout a cylindrical volume of the replacement rod.

17. The fuel assembly of claim 16, wherein the second material is zircaloy-4, and the volume fraction VR of the Hafnium to the Zircaloy-4 is between about 0.034 and about 0.08.

18. The fuel assembly of claim 17, wherein VR is between about 0.052 and about 0.064.

19. A method for repairing a nuclear fuel assembly, wherein the fuel assembly includes a plurality of elongated fuel rods arranged in a parallel array, each fuel rod containing a fissile fuel and each fuel rod having a neutron absorption capacity, comprising the steps of:

removing a damaged one of the fuel rods from the fuel assembly;

inserting a replacement rod into the fuel assembly in a position from which the damaged fuel rod was removed, wherein the replacement rod includes hafnium sufficient to substantially replace the neutron absorption capacity of the damaged fuel rod, and a second material.

20. A method for refurbishing a fuel assembly in a nuclear reactor that includes a damaged fuel rod, including the steps of:

providing a replacement rod that includes Hafnium sufficient to substantially replace the neutron absorbing capacity of the damaged fuel rod; and replacing the damaged fuel rod from the fuel assembly with the replacement rod, wherein the Hafnium is fabricated into a cylindrically-shaped rodlet and the second material is fabricated into an annulus around the rodlet.

21. The method of claim 20, wherein the replacement rod includes a second material selected from the group consisting of a stainless steel, a zirconium alloy and zirconium.

* * * * *